United States Patent [19]
Bruno

[11] Patent Number: 5,082,811
[45] Date of Patent: Jan. 21, 1992

[54] CERAMIC DIELECTRIC COMPOSITIONS AND METHOD FOR ENHANCING DIELECTRIC PROPERTIES

[75] Inventor: Salvatore A. Bruno, Wilmington, Del.

[73] Assignee: E. I. Du Pont de Nemours and Company, Wilmington, Del.

[21] Appl. No.: 506,965

[22] Filed: Feb. 28, 1990

[51] Int. Cl.$^5$ .............................................. C04B 35/46
[52] U.S. Cl. ..................... 501/134; 501/135; 501/136; 427/220; 106/286.4
[58] Field of Search ............ 501/134, 135, 136, 137, 501/138; 106/287.24, 419, 287.17, 286.4; 427/62, 63, 79, 220, 376.6, 383.5, 383.3, 419.8

[56] References Cited

U.S. PATENT DOCUMENTS

| | | | |
|---|---|---|---|
| 3,330,697 | 7/1967 | Pechini | 427/62 |
| 4,579,594 | 4/1986 | Nanao et al. | 106/287.17 |
| 4,668,299 | 5/1987 | Nanao et al. | 106/287.24 |
| 4,897,378 | 1/1990 | Chiang | 505/1 |

Primary Examiner—William R. Dixon, Jr.
Assistant Examiner—Paul Marcantoni

[57] ABSTRACT

An improved ceramic dielectric composition comprising a plurality of mixed metal oxide dopants distributed homogeneously on the surface of ceramic powder particles, and a method for enhancing dielectric properties of such compositions by improving the chemical homogeneity of the particles.

16 Claims, 2 Drawing Sheets

FIG. 1

○ – $BaTiO_3$
⊘ – $Nb_2O_5$
⌒ – $Nd_2O_3$
● – $NiO$
◐ – $MnCO_3$

CERAMIC DIELECTRIC COMPOSITIONS AND METHOD FOR ENHANCING DIELECTRIC PROPERTIES

BACKGROUND OF THE INVENTION

The present invention relates to an improved ceramic dielectric composition comprising primarily of a mixture of metal oxide dopants distributed homogeneously on the surface of ceramic powder particles, and to a method for making such compositions.

Ceramic dielectric powders are used in the fabrication of a wide variety of microelectronic devices. Typically, ceramic powders with a high dielectric constant are used for preparing multilayer ceramic capacitors (MLC's). Ceramic powders with a low dielectric constant are used in packaging semiconductor devices.

Traditionally, ceramic dielectric powders are prepared by physically blending a mixture of ceramic powders, with or without frits. These ceramic powders can be processed rapidly and economically, using readily available equipment to yield relatively dense monolithic bodies and multiphase ceramic bodies. The term "multiphase ceramic bodies" refers herein to ceramic particles of one composition embedded in a matrix of a different composition. In MLC's, for example, a dielectric may contain discrete grains of essentially pure barium titanate in a shell of doped barium titanate or within a glassy matrix. This type of complex structure can be difficult to synthesize by other methods. Typically, however, in the traditional blending method, the blend is inherently non-uniform because each component of the mixture has a different particle size distribution, particle morphology and surface properties. As a result, the fired ceramic is chemically non-homogeneous, contains pores and voids, but is tolerable since these deficiencies are smaller than the thickness of the ceramic layer and the scale of the printed circuitry.

Nevertheless, as electronic devices have become smaller and the miniaturization of electronic circuits has progressed, the traditional methods of producing ceramic powders have become inadequate, and the fabricated parts have become unreliable. The scale of the microcircuit elements has approached the scale of these defects.

Several approaches have been proposed to overcome these deficiencies. In one approach, the ceramic layer is created by direct decomposition of a solution of metal compounds, e.g., alkoxides. However, this approach can be slow, cumbersome and unreadily adaptable to mass production. Also, the reliable control of grain size and layer thickness, which are essential to modern electronic devices, can be difficult. U.S. Pat. No. 4,579,594, for example, describes preparation of an inorganic composite material by decomposing a solution containing at least two metals comprising a metal alkoxide oligomer, a metal chelate, a chelating agent and an aldehyde, which solubilizes the metal composition in an organic solvent. This method is inapplicable for coating fine ceramic particles due to binding of particles and formation of large aggregates, which are unsuitable for production of a smooth ceramic. Moreover, multiphase ceramic bodies, preferred in many electronic applications, are not produced. U.S. Pat. No. 3,330,697 describes a method of preparing alkaline earth and lead titanates, niobates and zirconates by polymerizing the corresponding metal chelates with a polyhydroxy alcohol to yield a uniform distribution of dopants throughout the ceramic particle.

Another approach is described in International Publication Number WO 88/08830, that is, a technique in which differences in particle surface charge cause fine discrete particles of the dopant to associate with a larger ceramic particle.

U.S. Pat. No. 3,490,927 describes an approach to bring about a chemical reaction between a desired additive and the surface of the ceramic particle, but is limited to situations where the appropriate reactivity exists between two chemical components. Such reactions tend to be slow and have limited commercial operation. The process involves coating the particle surface of a titanate powder by hydrolyzing a niobium or tantalum alkoxide of a high boiling polyhydroxy alcohol in the presence of a titanate powder.

The deficiencies of traditional blending methods have been overcome by the present invention. Also, the present invention can produce multiphase ceramic bodies which can be difficult to produce by other methods. More particularly, the present invention is an improved ceramic dielectric composition comprising primarily of a mixture of metal oxide dopants incorporated into a chemically homogeneous coating on the surface of ceramic powder particles.

SUMMARY OF THE INVENTION

The invention relates to an improved ceramic dielectric composition comprising ceramic powder particles having primarily a mixture of metal oxide dopants distributed on the surface thereof to form a chemically homogeneous coating layer, and to a process for enhancing the dielectric properties of such compositions by improving the chemical homogeneity of the particles. The process yields an improved ceramic powder especially useful for preparing multilayer dielectric components having very thin dielectric layers, which have significantly fewer voids and defects and which exhibit excellent electrical properties, greater insensitivity to moisture and consistency of electrical properties.

The ceramic powder particles, i.e., the primary ceramic component on which the coating layer is applied, based on their dielectric properties, have a wide range of K values. The ceramic powders, which have a K value in excess of 12, are of a formula $ABO_3$ wherein A is predominantly an alkaline earth metal, lead or mixtures thereof; and B is predominantly titanium, zirconium or mixtures thereof. The ceramic powders, which have a K value of 12 or less, are alumina, silica and silicates.

The homogeneous coating comprises a plurality of mixed metal oxide dopants and/or sintering aids, i.e., the secondary components are selected from the oxides of alkaline earth metals such as magnesium and lead oxide; oxides of B site metals such as titanium, zirconium and tin; oxides of metals with a higher charge than titanium such as niobium, tantalum metal oxides with a lower charge than titanium such as manganese, iron, cobalt, chromium, zinc, nickel and copper; rare earth metal oxides such as neodymium, samarium and praseodymium; and a glass modifier metal oxide such as aluminum and silicon and mixtures of the above secondary components.

The process by which the secondary components are applied to the primary ceramic component comprises the following steps:

(a) adding a stable solution of metal chelates to a slurry of fine particles of a ceramic powder with agitation;

(b) adding a strong base, heating and maintaining reaction conditions long enough to decompose the metal chelates and deposit a chemically homogeneous coating comprising secondary components on the surface of the ceramic particles; and (c) recovering, washing and drying the coated particles.

The solution of metal chelates is prepared by first mixing a chelating agent with a solvent. The desired metal compounds are added by stirring and are of the general formula, MXn, wherein M is a metal cation selected from magnesium, lead, titanium, zirconium, tin, niobium, tantalum, tungsten, antimony, bismuth, manganese, iron, cobalt, chromium, zinc, copper, neodymium, samarium, nickel, praseodymium, aluminum and mixtures thereof;

X is an anion or a radical selected from $HCO_2-$, $CH_3CO_2-$, $-O_2C-CO_2-$, $-OH$, $-OR$, $-NO_3$ and $-Cl$ and mixtures thereof; and n is a whole number from 2 to 6 depending on the valence state of the metal cation, $M^{+n}$.

Upon adjustment of the pH in the range of 5 to 10, the chelating agent is capable of forming soluble chelates with the metal cations.

Next, a slurry of fine particles of ceramic powder is prepared. Optionally, a small amount of colloidal silica, which later serves as flux or sintering aid by lowering the firing temperature of the dielectric composition, may be added to the slurry. In preparing the solution of metal chelates and the slurry, suitable solvents can be deionized water or mixtures of deionized water and water miscible organic solvents.

The solution of metal chelates is added to the slurry with agitation. The pH is raised to a value above 8.5 by addition of a strong base. The mixture is then heated to a temperature in the range between 50° C. and the reflux temperature for up to 8 hours to decompose the metal chelates and to deposit a homogeneous coating on the surface of ceramic particles. The coated ceramic particles are recovered by filtration or centrifugation, washed several times with deionized water and dried in an air or vacuum oven. The improved ceramic dielectric composition prepared by the process of the invention is a fine uniform particulate material partially or completely coated with a chemically homogeneous mixture of metal oxide dopants and sintering aids.

A further aspect of the invention is an improved multilayer ceramic device comprising an assemblage of layers of the ceramic dielectric composition and a conductive electrode material and is prepared according to the downstream processing steps described in greater detail in U.S. Pat. No. 4,640,905, the teachings of which are incorporated herein by reference.

Another aspect of the invention is a screen printable thick film composition comprising a homogeneous distribution of secondary components on the surface of the primary ceramic component prepared by the process of the present invention, mixed optionally with uncoated particles, in a volatile solvent.

DETAILED DESCRIPTION OF THE INVENTION

The invention relates to an improved ceramic dielectric powder composition in which secondary components are distributed homogeneously on the surface of ceramic powder particles to form chemically homogeneous coating layers, and to a process for enhancing the dielectric properties of such compositions by depositing such mixed metal oxide dopants on the surface of the powder particles and thereby improving the chemical homogeneity of the particles.

The ceramic dielectric powder to which this invention applies has an average particle size from 0.10 microns up to 10 microns, and the particles have a surface area range from 1 to 20 $m^2/g$. The ceramic powder particles, i.e., the primary ceramic component, based on their dielectric properties, have a wide range of K values. The ceramic powders, which have a K value in excess of 12, are of a formula $ABO_3$ wherein A is predominantly an alkaline earth metal, lead or mixtures thereof, and B is predominantly titanium, zirconium or mixtures thereof; and the ratio A/B is preferred to be close to 1.00. By way of example and not by limitation, high K ceramics are titanates of Mg, Sr, Ba, Pb and mixtures thereof. Best results are obtained where A is barium containing 0 to 2.5% Sr, and, particularly, 0 to 0.3% Sr; and B is titanium. The mole ratio of (Ba+Sr)/Ti is between 0.995 and 1.005 as described in greater detail in U.S. Pat. No. 4,640,905 and U.S. Pat. application Ser. No. 07/366,286, and lead titanate as described in U.S. Pat. No. 4,582,814. The ceramic powders, which have a K value of 12 or less, are alumina, silica and silicates and mixtures thereof, such as cordierite, mullite, anorthite.

The homogeneous coating comprises a plurality of mixed metal oxide dopants and sintering aids, i.e., the secondary components which are selected from the oxides of alkaline earth metals such as magnesium and lead oxide; oxides of B site metals such as titanium, zirconium and tin; oxides of metals with a higher charge than titanium such as niobium, tantalum, tungsten, antimony and bismuth; metal oxides with a lower charge than titanium such as manganese, iron, cobalt, chromium, zinc, nickel and copper; rare earth metal oxides such as neodymium, samarium and praseodymium; and a glass modifier metal oxide such as aluminum and silicon and mixtures of the above secondary components.

The process by which the secondary components are applied to the primary ceramic component comprises the following steps:

(a) adding a stable solution of metal chelates to a slurry of fine particles of a ceramic powder with agitation;

(b) adding a strong base, heating and maintaining conditions long enough to decompose the metal chelates and deposit a chemically homogenous coating comprising secondary components on the surface of the primary ceramic component; and (c) recovering, washing and drying the coated particles.

A solution of metal chelates comprising metal compounds in a solvent with a chelating agent is prepared. The term chelating agent refers herein to a polydentate ligand whose structures permit the attachment of two or more donor sites to the same metal ion simultaneously, thus closing one or more rings. A ligand is defined as any atom, ion, or molecule capable of functioning as a donor partner in one or more coordinate bonds. Chelating agents useful in practicing the invention are alpha-hydroxycarboxylic acids, such as lactic, glycolic, malic and citric acid or alphaaminocarboxylic acids, such as ethylene diamine tetracetic acid (EDTA) and glycine. A solution of the chelating agent is prepared using a solvent, for example, deionized water or mixtures of deionized water with miscible solvents such as methanol, ethanol and isopropanol. The solvent may optionally contain small amounts of wetting agents or surfactants to facilitate dissolution of the metal compounds. It is important that a sufficient amount of chelating agent be added to produce a clear solution of metal chelates. The desired metal compounds are added to the above chelating agent and solvent by stirring. The metal compounds are of the general formula, MXn, wherein M is a metal cation selected from magnesium, lead, titanium, zirconium, tin, niobium, tantalum, tungsten, antimony, bismuth, manganese, iron, cobalt, chromium, zinc, copper, neodymium, samarium, nickel, praseodymium, aluminum and mixtures thereof;

X is an anion or a radical selected from $HCO_2^-$, $CH_3CO_2^-$, $^-O_2C-CO_2^-$, $-OH$, $-OR$, $-NO_3$ and $-Cl$ and mixtures thereof; and n is a whole number from 2 to 6 depending on the valence state of the metal cation, $M^{+n}$.

The quantity of metal compounds used is determined by the ratio of the secondary components to the primary ceramic component desired in the resulting ceramic dielectric composition. The pH is adjusted to a value in the range of 5 to 10, typically by the addition of a strong base selected from ammonium hydroxide, tetramethylammonium hydroxide, sodium hydroxide and potassium hydroxide. It is preferred the pH be between 5 to 8 whereby a stable solution of metal chelates is obtained. Although the pH is one factor for obtaining a stable solution of metal chelates, other factors include the metal, valence state and chelating agent. Upon adjustment of pH, the chelating agent is capable of forming soluble chelates with the metal cations. It is important that the metal compounds are completely dissolved and a sufficient amount of chelating agent is added to accomplish this. It may be necessary to add chelating agent after the addition of the metal compounds in order to obtain a clear solution.

An aqueous or aqueous/organic slurry of fine particles of ceramic powder is prepared. The solvent can be selected from deionized water or mixtures of deionized water and water miscible organic solvents. A small amount, 0.05 to 0.1% but not more than 0.25%, of colloidal silica sol, based on the weight of the primary ceramic component, may be added to the slurry. The silica, which will be present in the resulting composition, can serve as a flux or function as sintering aid by lowering the firing temperature of the composition.

Next, the solution of metal chelates is added to the slurry with agitation. After the addition of the solution of metal chelates, the pH is raised above 8.5, typically above 10, by addition of a strong base, for example, potassium hydroxide and sodium hydroxide. The mixture is heated to a temperature in the range between 50° C. and the reflux temperature for up to 8 hours, typically for at least 4 hours, to decompose the metal chelates and to deposit a chemically homogeneous coating of the secondary components on the surface of the primary ceramic component. Using sodium hydroxide for purposes of illustration, the decomposition of the metal chelate (I), to form corresponding hydrous metal oxides or metal oxides can be shown by the following equation:

wherein for example lactic acid R is $CH_3-$ or for example malic acid R is $-CH_2COO^-Na^+$.

By controlling the reaction conditions, the hydrous metal oxides or metal oxides deposit on the surface of the primary ceramic component, e.g., barium titanate, rather than form as separate particles. The coated ceramic particles are recovered by filtration or centrifugation, washed several times with deionized water to remove any soluble organic or inorganic materials which may be present and dried in an air or vacuum oven. A calcining step prior to fabricating dielectric components is optional. The process yields an improved ceramic powder composition comprising fine uniform particulate material partially or completely coated with a chemically homogeneous mixture of the dopants and sintering aids. The ceramic powder is especially useful for preparing multilayer dielectric components having very thin dielectric layers, which have significantly fewer voids and defects and exhibit excellent electrical properties, greater insensitivity to moisture and consistency of electrical properties when compared to similar components made from powders prepared by conventional mixing techniques.

Figure 1:
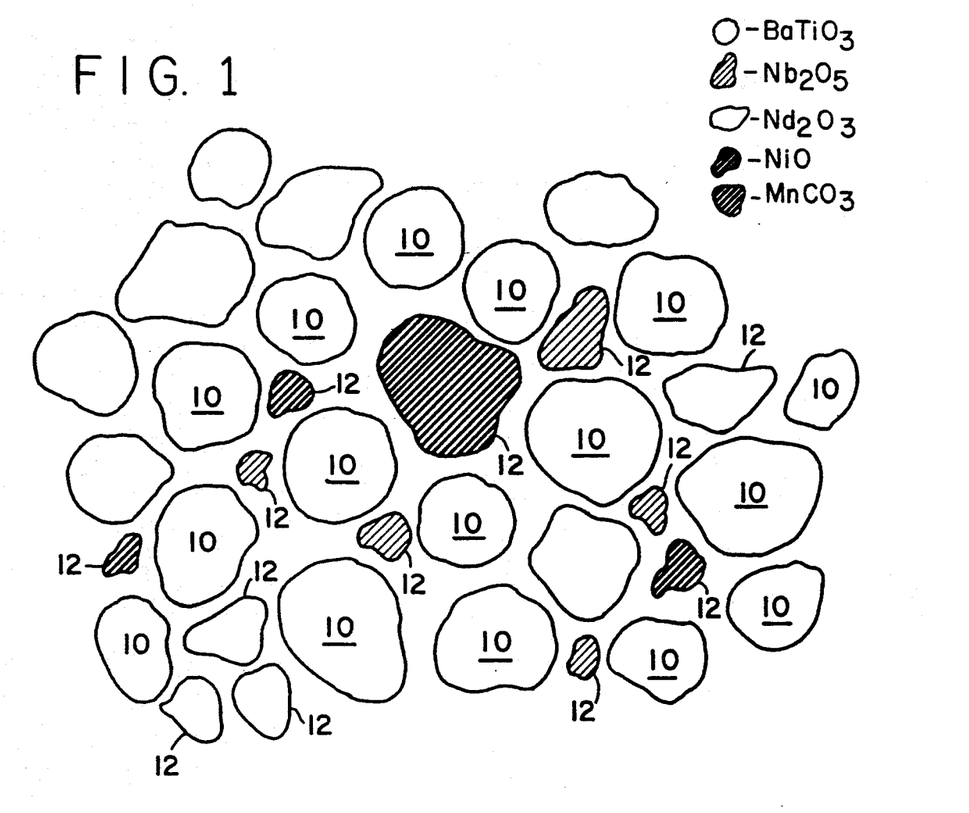
FIG. 1 is a schematic representation of ceramic dielectric powder particles prepared by traditional blending methods of the prior art.

Referring now to the drawings, FIG. 1 is a schematic view, greatly enlarged for illustration, of a typical ceramic dielectric powder which has been prepared by traditional blending methods known in the art. The powder, prior to being processed to form dielectric layers, i.e., green tape, is a physical blend of micron to sub-micron particles which consists of a primary ceramic component 10 and a plurality of other secondary components 12, such as dopants. The disparity in the relative size of the particles makes it practically impossible in all cases to achieve a uniform distribution of the various components throughout the blend. Any nonuniformity, therefore, can result in voids, discontinuities, etc., being formed during downstream processing of the composition into microelectronic devices.

Figure 2:
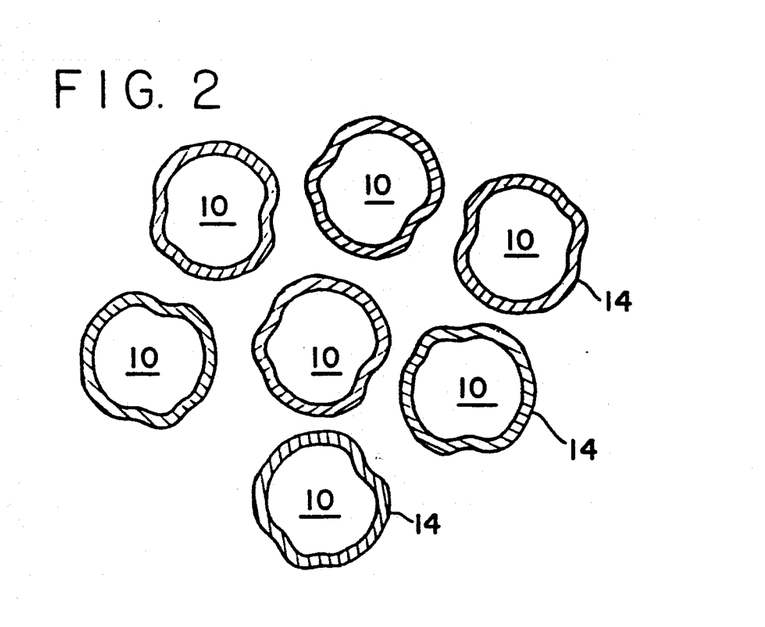
FIG. 2 is a schematic representation of ceramic dielectric powder particles prepared by the process of the invention.

Ceramic dielectric powder compositions which are produced according to the invention can be seen in FIG. 2. Primary ceramic components 10, such as, for example, commercially available barium titanate powder, are coated with a chemically homogeneous layer 14 of the desired mixture of dopants and sintering aids. The coating layer 14 can be applied according to the invention so that the various components of the mixture are distributed on an atomic scale on the surface of the individual particles. The chemically homogeneous coating layer insures that components will remain uniformly distributed throughout downstream processing of the composition into dielectric layers so that microelectronic components produced therefrom will exhibit the desired electrical properties and reliability, i.e., the risk of voids, electrical discontinuities, etc. is substantially reduced.

The composition of the powders is determined by using x-ray fluorescence analysis and inductively coupled plasma (ICP) analysis. The ceramic particles should constitute at least 95%, typically 97%, of the composition. The $Nb_2O_5$ or $Ta_2O_5$ metal oxides amount to between 0.25 to 3% and NiO and MnO metal oxides are not in excess of 0.5%. The concentration of the rare earth metal oxides, $Nd_2O_3$ and $Sm_2O_3$ are usually less than 1.5%. It is desirable that the total concentration of $Nb_2O_5$ or $Ta_2O_5$ and the rare earth metal oxides is less than 2.0 mole % in order that K and Insulation Resistance (IR) values of capacitors made from these compositions are not lowered excessively. When silica is added to the slurry to lower the sintering temperature of the compositions, its concentration range is 0.05 to 0.1% and no more than 0.25%. The concentration of optional metal oxides or mixtures thereof which are incorporated into the coating is generally not in excess of 0.25% of the product composition.

Figure 3:
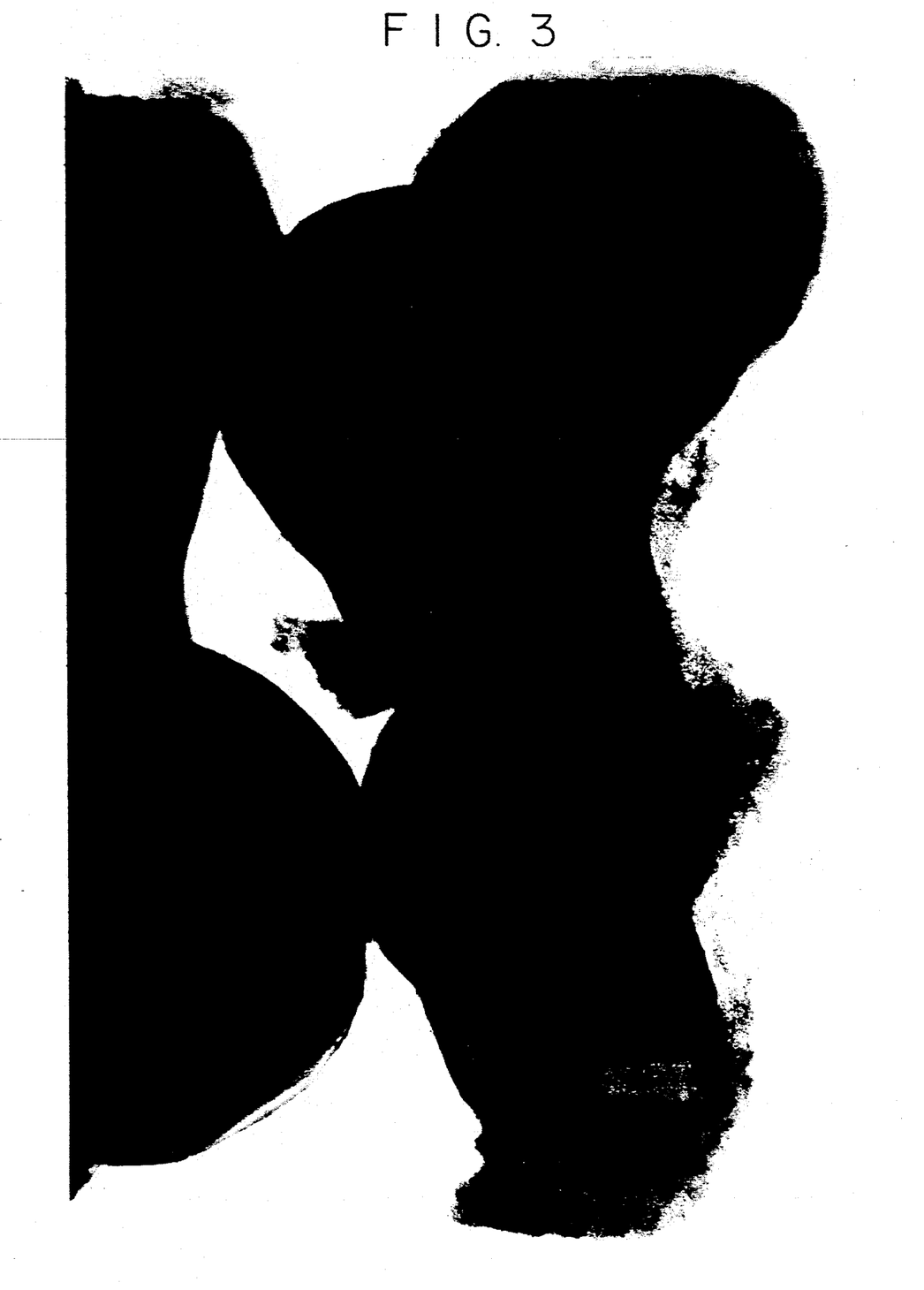
FIG. 3 is a transmission electron micrograph of an individual ceramic dielectric powder particle prepared by the process of the invention.

The characteristics of the surface coating may be ascertained by transmission electron microscopy (TEM) and energy dispersive spectroscopy (EDS). Referring to the drawings, FIG. 3 is a transmission electron micrograph of an individual dielectric ceramic powder particle produced according to this invention. This particular particle is the product of Example 1. From this micrograph, the darker portion is the primary ceramic component, barium titanate. Certain lighter portions on the surface of the barium titanate are the secondary components distributed homogeneously. The secondary components are all in essentially intimate contact with the primary ceramic component and are not identified as isolated components. They are present as an amorphous and/or a very fine microcrystalline coating. This coating typically is distributed non-uniformly on the surface of the ceramic particles. The entire particulate surface is not necessarily covered, although most of the particles have some coating. The amount of coating may vary from one particle to the next. The various secondary components are homogenously distributed throughout the coating and are present in the same relative amounts as were used in the preparation of the compositions.

The improved ceramic composition of this invention is particularly useful in preparing an X7R dielectric of the type, for example, described in U.S. Pat. No. 4,803,591.

A further aspect of the invention is an improved multilayer ceramic device comprising an assemblage of layers of the ceramic dielectric composition and a conductive electrode material prepared according to the downstream processing steps of:

(a) adding a stable solution of metal chelates to a slurry of fine particles of a ceramic powder with agitation;
(b) adding a strong base, heating and maintaining reaction conditions long enough to decompose the metal chelates and deposit a chemically homogeneous coating comprising a mixture of secondary components on the surface of the ceramic particles; and
(c) recovering, washing and drying the coated particles.
(d) casting a dispersion of coated particles of ceramic powder mixed optionally with uncoated ceramic particles of ceramic powder in a solution of binder polymer and a volatile solvent to form a tape casting composition;
(e) placing a thin layer of the tape casting composition on a flexible substrate and heating the cast layer to remove the volatile solvent therefrom to form a green tape;
(f) applying a layer of conductive electrode material dispersed in an organic medium to each of a plurality of layers of green tape;
(g) laminating a plurality of the electrode-layered green tape to form an assemblage of alternating layers of green tape and electrode material; and
(h) firing the assemblage at 750° to 1150° C. to remove the organic medium and organic binder therefrom and to sinter the conductive electrode material and dielectric.

The fabrication of MLC's is described in greater detail in U.S. Pat. No. 4,640,905, the teachings of which are incorporated herein by reference.

Another method for fabricating MLC's involves forming a thick film paste by dispersing the coated dielectric powder particles prepared by the process of the present invention, mixed optionally with uncoated particles, in a volatile solvent. By using screen printing techniques, as described in greater detail in U.S. Pat. No. 4,640,905, the teachings of which are incorporated herein by reference, a dielectric and metal layer structure is designed. An assemblage, which includes the dielectric and metal layer structure and a second electrode layer, is co-fired.

The following examples serve to illustrate the invention, but are not intended to limit the scope of the invention.

EXAMPLES

The mixed oxides, other than BaO and $TiO_2$, contained in the dielectric powder compositions prepared in the following examples were determined by ICP analysis and the results are given in Table 1 below.

The improved dielectric powder compositions prepared in the following examples were used to fabricate multilayer capacitors by the procedures which are described in greater detail in U.S Pat. No. 4,640,905 and U.S. patent application Ser. No. 07/366,286, the teachings of which are incorporated herein by reference.

The critical electrical properties of the multilayer capacitors, capacitance, dissipation factor, insulation resistance and temperature coefficient of capacitance are also described in U.S. patent application Ser. No. 07/366,286. The results obtained for the multilayer capacitors made from the dielectric powder compositions of the following examples are given in Table 2 below.

EXAMPLE 1

This example describes the preparation of barium titanate coated with 1% $Nb_2O_5$, 0.6% $Nd_2O_3$, 0.2% NiO and 0.1% MnO.

Deionized water (75 ml) and 15.29 g (0.1129 mole) of D,L-malic acid were charged to a 400 ml beaker under a nitrogen atmosphere. Niobium pentachloride powder (5.09 g, 99.9%, 0.01881 mole) was added to the clear agitated solution at approximately 26° C. and the white slurry was agitated at 22° to 26° C. for approximately 20 minutes. By means of a syringe pump aqueous sodium hydroxide solution (44.0 g, 30%, 0.33 mole) was added over a period of 55 minutes to the slurry at 22° to 26° C. To the resulting clear colorless solution, pH 9.0, was added neodymium chloride hexahydrate (3.20 g, 99.9%, 0.008916 mole) and the clear light blue violet solution was agitated for approximately 10 minutes. Nickelous chloride hexahydrate (1.59 g, 0.006693 mole) was added and the clear light greenish blue solution was agitated for approximately 10 minutes. Manganous chloride tetrahydrate (0.70 g, 0.003524 mole) was added to the solution and the mixture was agitated for approximately 30 minutes. To the mixture, which contained a small amount of a light grayish green precipitate was added 0.86 g (0.006349 mole) of D,L-malic acid and the mixture was agitated at approximately 25° C. for about 30 minutes. The clear greenish blue metal chelate solution, pH 6.0, was diluted to 250 g by the addition of deionized water.

Into a separate one gallon container was added 2750 ml of deionized water and 245.3 g of barium titanate. The barium titanate for this experiment had a surface area of 1.0 $m^2/g$. The mixture was agitated for 1.5 hours. To the slurry, pH 9.0, the metal chelate solution was added, by means of a syringe pump, over about 2 hours at approximately 22° C. The white slurry, pH 6.6, was agitated at approximately 22° C. for about 1.5 hours. By means of a syringe pump aqueous sodium hydroxide solution (12.8 g, 30%, 0.096 mole) was added over approximately 30 minutes at 22° C. The cream colored slurry, pH 11.6, was agitated at approximately 25° C. for about 30 minutes. The slurry was heated under reflux, 100° C., for 8 hours. After cooling to approximately 25° C. the cream colored slurry, pH 11.8, was filtered. The filter cake was washed with 7 liters of deionized water and dried to give 248 g (99% yield) of a light tan solid having a surface area of 8.3 $m^2/g$.

The product was examined using transmission electron microscopy (TEM) and energy dispersive spectroscopy (EDS). No precipitated oxides were observed separate from barium titanate particles and they were all present in the coating. The various coating elements were homogeneously distributed throughout the coating, since all areas of the coating examined by EDS contained all the coating elements in the relative amounts that approximated the ratios used in the preparation. The coating was seen to be amorphous and/or very fine microcrystalline and it was distributed non-uniformly on the barium titanate particle surface. Areas with and without coating were easily recognized in the TEM images. Most but not all of the barium titanate particles have some coating.

The product was shown by X-ray fluorescence analysis to have a (Ba+Sr)/Ti mole ratio of 1.001.

The composition of the product of this example and the critical electrical properties of MLC's made from it are given in Tables 1 and 2 below.

EXAMPLE 2

This example describes the preparation of barium titanate coated with 1.2% $Nb_2O_5$, 0.8% $Nd_2O_3$, 0.23% NiO and 0.05% MnO.

Deionized water (75 ml) and 18.34 g (0.1354 mole) D,L-Malic acid (99%) were charged to a 400 ml covered beaker under a nitrogen atmosphere. Niobium (V) chloride powder (6.10 g, 99.9%, 0.0226 mole) was added to the clear agitated solution at approximately 25° C. and the white slurry was agitated for about 30 min. By means of a syringe pump aqueous sodium hydroxide solution (51.8 g, 30%, 0.39 mole) was added to the slurry at approximately 26° C. over about 75 min. To the resulting clear colorless solution (pH 8.9) was added neodymium chloride hexahydrate (4.27 g, 99.9%, 0.0119 mole) and the clear light blue violet solution allowed to agitate for about 10 min. Nickelous chloride hexahydrate (1.83 g, 0.00769 mole) was added and the clear light greenish blue solution allowed to agitate for 5 min. Manganous chloride tetrahydrate (0.35 g, 0.001762 mole) was added and the mixture allowed to agitate for about 10 min. To the mixture which contained a small amount of precipitate was added 0.7 g (0.00517 mole) of D,L-malic acid (99%) and the mixture allowed to agitate for about 30 min. The clear greenish blue solution (pH 6.0) was diluted to 250 g by the addition of deionized water.

Into a separate 1-gal polypropylene container was added under a nitrogen atmosphere 2750 ml of deionized water and 244.3 g of barium titanate. The barium titanate for this experiment had a surface area of 1.3 $m^2/g$. The mixture was allowed to agitate for about 1.5 hrs. To the slurry (pH 9.2) by means of a syringe pump, the metal chelate solution was added over about 2 hrs. at approximately 25° C. The white slurry (pH 6.8) was allowed to agitate at approximately 24° C. for about 1 hr. By means of a syringe pump, aqueous sodium hydroxide solution (11.1 g, 30%, 0.0833 mole) was added over about 1 hr at approximately 25° C. The cream colored slurry (pH 11.6) was heated under reflux (100° C.) for about 8 hrs. After cooling to approximately 25° C. the slurry (pH 11.5) was filtered. The filter cake was washed with 8.5-liters of deionized water and dried to give 249 g (99.6%) of a tan solid which has a surface area of 9.1 $m^2/g$.

The product was shown by x-ray fluorescence analysis to have an (Ba+Sr)/Ti mole ratio of 0.998.

The composition of the product of this example and the critical electrical properties of MLC's made from it are given in Tables 1 and 2 below.

EXAMPLE 3

This example describes the preparation of barium titanate coated with 0.9% $Nb_2O_5$, 0.6% $Nd_2O_3$, 0.173% NiO and 0.038% MnO.

The procedure for the preparation of the metal chelate solution was the same as that described in Example 1. The clear greenish blue metal chelate solution (250 g, pH 5.9) was shown by ICP analysis to have the following composition of metals calculated as metal oxides; $Nb_2O_5$, 1.22%; $Nd_2O_3$, 0.77%; NiO, 0.23%; MnO, 0.050% and $Na_2O$, 5.19%.

Into a 1-gal polypropylene reactor under a nitrogen atmosphere was added 2750 ml of deionized water and 244.3 g of barium titanate. The barium titanate used for these experiments had a surface area of 1.3 $m^2/g$. The slurry was allowed to agitate for about 1.5 hrs. To the slurry (pH 9.6), the metal chelate solution (187.5 g) was added over about 1.3 hrs. at approximately 23° C. The white slurry (pH 6.9) was allowed to agitate at approximately 23° C. for about 1.5 hrs. By means of a syringe pump, sodium hydroxide solution (11.3 g, 30%, 0.084 mole) was added over about 30 min. The slurry (pH 11.6) was heated under reflux (102° C.) for 8 hrs. After cooling to approximately 25° C. the cream colored slurry (pH 11.6) was filtered. The filter cake was washed with 10 liters of deionized water and dried to give 247.1 g (99.4%) of a light tan solid which has a surface area of 6.9 m$^2$/g.

The product was shown by x-ray fluorescence analysis to have a (Ba+Sr)/Ti mole ratio of 1.000.

The composition of the product of this example and the critical electrical properties of MLC's made from it are given in Tables 1 and 2 below.

EXAMPLE 4

This example describes the preparation of barium titanate coated with 0.6% Nb$_2$O$_5$, 0.4% Nd$_2$O$_3$, 0.115% NiO, and 0.025% MnO.

The procedure for the preparation of the metal chelate solution was the same as that described in Example 1. The clear greenish blue metal chelate solution (250 g, pH 6.2) was shown by ICP analysis to have the following composition of metals calculated as metal oxides: Nb$_2$O$_5$, 1.19%; Nd$_2$O$_3$, 0.65%; NiO, 0.23%; MnO, 0.048% and Na$_2$O, 5.13%.

Into a 1-gal polypropylene reactor under a nitrogen atmosphere was added 2750 ml of deionized water and 244.3 g of barium titanate. The barium titanate for this preparation had a surface area of 1.3 m$^2$/g. The slurry was allowed to agitate for about 1.5 hrs. To the slurry (pH 9.6) was added the metal chelate solution (125 g) over about 1 hr. at approximately 25° C. The white slurry (pH 7.1) was allowed to agitate at approximately 25° C. for about 1.5 hrs. By means of a syringe pump, sodium hydroxide solution (5.66 g, 30% NaOH, 0.0425 mole) was added over about 15 min at approximately 25° C. The slurry (pH 11.6) was heated under reflux (102° C.) for 8 hrs. After cooling to approximately 25° C. the cream colored slurry (pH 11.5) was filtered. The filter cake was washed with 7 liters of deionized water and dried to give 244.2 g (98.8%) of a light tan solid which has a surface area of 5.3 m$^2$/g.

The product was shown by x-ray fluorescence analysis to have an (Ba+Sr)/Ti mole ratio of 1.000.

The composition of the product of this example and the critical electrical properties of MLC's made from it are given in Tables 1 and 2 below.

EXAMPLE 5

This example describes the preparation of barium titanate coated with 1.0% Nb$_2$O$_5$, 0.6% Nd$_2$O$_3$, 0.2% NiO and 0.05% MnO.

The preparation of the metal chelate solution was the same as that described in Example 1. In this synthesis the concentration of metals in the chelate solution was set to be equal to the concentration of the metals in the coated barium titanate.

Into a 1-gal polypropylene reactor under a nitrogen atmosphere was added 2750 ml of deionized water and 244.3 g of barium titanate. The barium titanate for this preparation had a surface area of 1.3 m$^2$/g. The slurry was allowed to agitate at approximately 25° C. for about 1.5 hrs. To the slurry (pH 9.7) the metal chelate solution (250 g) was added over about 2 hrs. at approximately 25° C. The white slurry (pH 6.9) was allowed to agitate at approximately 25° C. for about 5 min. By means of a syringe pump, sodium hydroxide solution (7.1 g, 30% NaOH, 0.053 mole) was added over about 1.5 hrs. The slurry (pH 10.6) was heated under reflux (102° C.) for 8 hrs. After cooling to approximately 25° C. the cream colored slurry (pH 10.4) was filtered. The filter cake was washed with 7 liters of deionized water and dried to give 247.3 g (98.9%) of a light tan solid which has a surface area of 7.6 m$^2$/g.

The product was shown by x-ray fluorescence analysis to have an (Ba+Sr)/Ti mole ratio of 1.000.

The composition of the product of this example and the critical electrical properties of MLC's made from it are given in Tables 1 and 2 below.

EXAMPLE 6

This example describes the preparation of barium titanate coated with 1.0% Nb$_2$O$_5$, 0.6% Nd$_2$O$_3$, 0.2% NiO and 0.05% MnO.

The preparation of the metal chelate solution was the same as that described in Example 1. In this synthesis the concentration of metals in the chelate solution was set to be equal to the concentration of the metals on the coated barium titanate.

Into a 1-gal polypropylene reactor under a nitrogen atmosphere was added 2750 ml of deionized water and 245.4 g of barium titanate. The barium titanate for this preparation had a surface area of 1.3 m$^2$/g. The slurry was allowed to agitate at approximately 25° C. for about 1.5 hrs. To the slurry (pH 9.7) the metal chelate solution (250 g) was added over about 2 hrs. at approximately 24° C. The white slurry (pH 6.7) was allowed to agitate at approximately 24° C. for about 5 min. By means of a syringe pump, sodium hydroxide solution (10.9 g, 30% NaOH, 0.0818 mole) was added over about 40 min. at approximately 24° C. The slurry (pH 11.6) was heated under reflux (102° C.) for about 8 hrs. After cooling to approximately 25° C. the cream colored slurry (pH 11.5) was filtered. The filter cake was washed with 8.5 liters of deionized water and dried to give 248.4 g (99.4%) of a tan solid which has a surface area of 7.5 m$^2$/g.

The product was shown by x-ray fluorescence analysis to have a (Ba+Sr)/Ti mole ratio of 0.997.

The composition of the product of this example and the critical electrical properties of MLC's made from it are given in Tables 1 and 2 below.

EXAMPLE 7

This example describes the preparation of barium titanate coated with 1.2% Nb$_2$O$_5$, 0.8% Nd$_2$O$_3$, 0.23% NiO and 0.05% MnO.

The procedure for the preparation of this metal chelate solution was the same as that described in Example 1. In this synthesis the concentration of metals in the chelate solution was set to be equal to the concentration of the metals on the coated barium titanate.

Into a 1-gal polypropylene reactor under a nitrogen atmosphere was added 1000 ml of deionized water and 244.3 g of barium titanate. The barium titanate for this preparation had a surface area of 1.3 m$^2$/g. The slurry was allowed to agitate at approximately 25° C. for about 1.5 hrs. To the slurry (pH 9.8) was added the metal chelate solution (250 g) over about 2 hrs. at approximately 23° C. The white slurry (pH 6.9) was allowed to agitate at approximately 23° C. for 1 hr. By means of a syringe pump sodium hydroxide solution (10.5 g, 30%

NaOH, 0.0788 mole) was added over about 1 hr. at approximately 25° C. The slurry (pH 11.6) was heated under reflux (103° C.) for about 8 hrs. After cooling to approximately 25° C. the cream colored slurry (pH 11.7) was filtered. The filter cake was washed with 5.5 liters of deionized water and dried to give 246 g (98.4%) of a tan solid which has a surface area of 8.2 m$^2$/g.

The product was shown by x-ray fluorescence analysis to have a (Ba+Sr)/Ti mole ratio of 0.999.

The composition of the product of this example and the critical electrical properties of MLC's made from it are given in Tables 1 and 2 below.

EXAMPLE 8

This example describes the preparation of barium titanate coated with 1.2% $Nb_2O_5$, 0.8% $Nd_2O_3$, 0.23% NiO, 0.05% MnO and 0.1% $SiO_2$.

The preparation of the metal chelate solution was the same as that described in Example 1. In this synthesis the concentration of metals in the chelate solution was set to be equal to the concentration of the metals in the coated barium titanate.

Into a 1-gal polypropylene reactor under a nitrogen atmosphere was added 2750 ml of deionized water, 244.1 g of barium titanate and 0.63 g (0.252 g $SiO_2$) "Ludox" AS-40. "Ludox" AS-40 colloidal silica sol is a product of E. I. du Pont de Nemours and Company, Inc. The barium titanate for this preparation had a surface area of 1.3 m$^2$/g. The slurry (pH 9.0) was allowed to agitate at approximately 25° C. for 1.5 hrs. To the slurry the metal chelate solution (250 g) was added over about 2 hrs. at approximately 25° C. The white slurry (pH 6.6) was allowed to agitate at approximately 25° C. for about 1 hr. By means of a syringe pump, sodium hydroxide solution (12.6 g, 30% NaOH, 0.0945 mole) was added over about 1 hr. at approximately 25° C. The slurry (pH 11.6) was heated under reflux (100° C.) for about 8 hrs. After cooling to approximately 25° C. the cream colored slurry (pH 11.5) was filtered. The filter cake was washed with 9 liters of deionized water and dried to give 248.2 g (99.3%) of a tan solid which has a surface area of 10.1 m$^2$/g.

The product was shown by x-ray fluorescence analysis to have a (Ba+Sr)/Ti mole ratio of 1.000.

The composition of the product of this example and the critical electrical properties of MLC's made from it are given in Tables 1 and 2 below.

EXAMPLE 9

This example describes the preparation of barium titanate coated with 1.2% $Nb_2O_5$, 0.8% $Nd_2O_3$, 0.23% NiO, 0.05% MnO and 0.1% $SiO_2$.

The preparation of the metal chelate solution was the same as that described in Example 1. In this synthesis the concentration of metals in the chelate solution was set to be equal to the concentration of the metals on the coated barium titanate.

The procedure for the preparation of the coated barium titanate was the same as that for Example 8 except that 0.25 g of "Cab-o-Sil" (fumed silica) was substituted for the "Ludox" AS-40 (colloidal silica) of Example 8. "Cab-o-Sil" is a product of the Cabot Corporation.

The product was shown by x-ray fluorescence analysis to have an (Ba+Sr)/Ti mole ratio of 1.000.

The composition of the product of this example and the critical electrical properties of MLC's made from it are given in Tables 1 and 2 below.

EXAMPLE 10

This example describes the preparation of barium titanate coated with 0.75% $Nb_2O_5$, 0.45% $Nd_2O_3$, 0.163% ZnO, 0.0375% MnO and 0.1% $SiO_2$.

Deionized water (150 ml) and 30.6 g (0.2257 mole) of D,L-malic acid (99%) were charged to a beaker under a nitrogen atmosphere. Niobium (V) chloride (10.17 g, 99.9% $NbCl_5$, 0.0376 mole) was added to the clear agitated solution at approximately 25° C. The slurry was allowed to agitate at approximately 25° C. for about 30 min. By means of a syringe pump aqueous sodium hydroxide solution (84.2 g, 30% NaOH, 0.6315 mole) was added over about 35 min. at approximately 25° C. to adjust the pH to 8.5. Sodium hydroxide solution (1.8 g, 30% NaOH) was added in small portions over 1.5 hrs. in order to maintain the pH in the range of 7.5 to 8.5. To the resulting clear colorless solution (pH 7.7) was added neodymium chloride hexahydrate, $NdCl_3.6H_2O$, (6.4 g, 99.9%, 0.01783 mole) and the clear light blue violet solution allowed to agitate for about 5 min. Zinc chloride 1.82 g, (0.01339 mole) was added and the solution allowed to agitate for about 5 min. Manganous chloride tetrahydrate (0.70 g, 0.00352 mole) was added and the solution allowed to agitate for about 5 min. The light violet blue solution (pH 6.8) was diluted to 500 g with deionized water and filtered to remove traces of solids.

The product was shown by ICP analysis to have the following composition of metals calculated as metal Oxides; $Nb_2O_5$, 1.07%; $Nd_2O_3$, 0.58%; ZnO, 0.213%; MnO, 0.054% and $Na_2O$, 3.77%.

Into a 1-gal polypropylene reactor under a nitrogen atmosphere was added 2000 ml of deionized water, 490.7 g of barium titanate and 1.25 g "Ludox" AS-40, (0.50 g $SiO_2$). The barium titanate for this preparation had a surface area of 1.6 m$^2$/g. The slurry (pH 9.0) was allowed to agitate at approximately 25° C. for about 1.5 hrs. To the slurry the metal chelate solution (375 g) was added over about 15 min. at approximately 23° C. The slurry (pH 7.4) was allowed to agitate at approximately 23° C. for about 5 min. By means of a syringe pump, sodium hydroxide solution (12.6 g, 30% NaOH, 0.0945 mole) was added over about 15 min. at approximately 23° C. The slurry (pH 11.7) was allowed to agitate at approximately 23° C. for 30 min. The slurry was heated under reflux (100° C.) for 8 hrs. After cooling to approximately 25° C. the cream colored slurry (pH 11.4) was filtered. The filter cake was washed with 15.5 liters of deionized water and dried to give 493.5 g (98.7%) of a tan solid which has a surface area of 6.1 m$^2$/g.

The product was shown by x-ray fluorescence analysis to have a (Ba+Sr)/Ti mole ratio of 0.997.

The composition of the product of this example and the critical electrical properties of MLC's made from it are given in Tables 1 and 2 below.

EXAMPLE 11

This example describes the preparation of barium titanate coated with 0.75% $Nb_2O_5$, 0.45% $Nd_2O_3$, 0.20% NiO, 0.05% MnO and 0.10% $SiO_2$.

The procedure for the preparation of the metal chelate solution was the same as that described in Example 10. The clear greenish blue metal chelate solution (600 g, pH 6.9) was shown by ICP analysis to have the following composition of metals calculated as metal oxides; $Nb_2O_5$, 0.718%; $Nd_2O_3$, 0.501%; NiO, 0.196%; MnO, 0.050% and $Na_2O$, 2.93%.

Into a 1-gal polypropylene reactor under a nitrogen atmosphere was added 2000 ml of deionized water, 492.5 g of barium titanate and 1.25 g "Ludox" AS-40 (0.5 g $SiO_2$). The barium titanate for this preparation had a surface area of 1.1 $m^2/g$. The slurry (pH 9.1) was allowed to agitate at approximately 25° C. for 1.5 hrs. To the slurry the metal chelate solution (500 g) was added over about 15 min. at approximately 27° C. The slurry (pH 7.1) was allowed to agitate at approximately 27° C. for 40 min. By means of a syringe pump, sodium hydroxide solution (22.5 g, 30% NaOH, 0.169 mole) was added over about 30 min. at approximately 27° C. for about 4.5 hrs. After cooling to approximately 25° C. the slurry (pH 11.4) was filtered. The filter cake was washed with 17 liters of deionized water and dried to give 481.4 g (96.3%) of a tan solid which has a surface area of 6.9 $m^2/g$.

The metal oxide content other than BaO, SrO and $TiO_2$ was shown by ICP analysis to be the following; $Nb_2O_5$, 0.70%; $Nd_2O_3$, 0.28%; NiO, 0.204%; MnO, 0.054%; $SiO_2$, 0.148% and $Na_2O$ <0.01%.

The critical electrical properties of MLC's made from the product of this example are given in Table 2 below.

TABLE 1

| Ex. No. | COMPOSITION OF METAL OXIDE COATING (%)[1] | | | | | | | |
|---|---|---|---|---|---|---|---|---|
| | $Nb_2O_5$ | $Nd_2O_3$ | NiO | ZnO | MnO | $SiO_2$ | $Na_2O/K_2O$ | Notes |
| 1 | 1.06 | 0.62 | 0.19 | — | 0.10 | — | <0.01/<0.02 | 2 |
| 2 | 1.18 | 0.81 | 0.22 | — | 0.05 | <0.02 | /<0.01 | 2 |
| 3 | 0.83 | 0.66 | 0.18 | — | 0.04 | — | <0.01/<0.02 | 2 |
| 4 | 0.58 | 0.39 | 0.14 | — | 0.03 | — | <0.01/<0.01 | 2 |
| 5 | 1.02 | 0.48 | 0.17 | — | 0.05 | — | <0.01/<0.01 | 2 |
| 6 | 0.97 | 0.59 | 0.20 | — | 0.05 | — | <0.01/<0.01 | 2 |
| 7 | 1.23 | 0.81 | 0.22 | — | 0.05 | <0.02 | /<0.01 | 2 |
| 8 | 1.34 | 0.86 | 0.24 | — | 0.05 | 0.10 | /<0.01 | 3 |
| 9 | 1.21 | 0.80 | 0.22 | — | 0.05 | 0.10 | /<0.01 | 4 |
| 10 | 1.01 | 0.53 | — | 0.20 | 0.05 | 0.1 | 0.03/ | 3 |
| 11 | 1.18 | 0.73 | 0.30 | — | 0.07 | 0.17 | 0.04/ | 3 |
| 12 | 0.70 | 0.28 | 0.20 | — | 0.05 | 0.15 | <0.001/ | 3 |

NOTES
[1]If not otherwise specified the barium titanate to which the coating was applied contained 0.25 to 0.35% SrO.
[2]Silica (0.1% $SiO_2$) in the form of "Cab-O-Sil" was added to the dielectric formulation.
[3]Silica in the form of "Ludox" AS-40 was added during the powder synthesis.
[4]Silica in the form of "Cab-O-Sil" was added during the powder synthesis.

The slurry (pH 11.8) was heated under reflux (104° C.) for about 8 hrs. After cooling to approximately 25° C. the cream colored slurry (pH 11.9) was filtered. The filter cake was washed with 15.5 liters of deionized water and dried to give 493.1 g (98.6%) of a tan solid which has a surface area of 8.2 $m^2/g$.

The product was shown by x-ray fluorescence analysis to have a (Ba+Sr)/Ti mole ratio of 0.997.

The composition of the product of this example and the critical electrical properties of MLC's made from it are given in Tables 1 and 2 below.

EXAMPLE 12

This example describes the preparation of barium titanate coated with 0.75% $Nb_2O_5$, 0.45% $Nd_2O_3$, 0.20% NiO, 0.05% MnO and 0.10% $SiO_2$.

The procedure for the preparation of the metal chelate solution was the same as that described in Example 10 except that nickelous chloride hexahydrate was used in place of zinc chloride. In this synthesis the concentration of metals in the chelate solution was set to be equal to the concentration of the metals on the coated barium titanate.

Into a 1-gal polypropylene reactor under a nitrogen atmosphere was added 2000 ml of deionized water, 492.3 g of barium titanate and 1.25 g "Ludox" AS-40 (0.5 g $SiO_2$). The barium titanate for this preparation had a surface area of 1.1 $m^2/g$. The slurry was allowed to agitate at approximately 25° C. for about 1.5 hrs. To the slurry the metal chelate solution (500 g) was added over about 15 min. at approximately 25° C. The mixture (pH 7.1) was allowed to agitate at approximately 25° C. for about 23 hrs. By means of a syringe pump, sodium hydroxide solution (13.9 g, 30% NaOH, 0.104 mole) was added over about 30 min. at approximately 25° C. The slurry (pH 11.8) was heated under reflux (101° C.)

TABLE 2

| | ELECTRICAL PROPERTIES OF MLC's[1] MADE FROM COATED POWDERS | | | | |
|---|---|---|---|---|---|
| Ex. No. | K | % DF | IR 25° C. | IR 125° C. | $TCC^2$ −55° C./125° C. |
| 1 | 3784 | 1.92 | 2840 | 160 | 3.4/0.3 |
| 2 | 2580 | 2.7 | 9500 | 350 | 0.3/−14 |
| 3 | 3230 | 2.5 | 15000 | 430 | −3/−7 |
| 4 | 4830 | 2.9 | 8000 | 550 | −5/−7 |
| 5 | 3404 | 2.8 | 9070 | 570 | 4.8/−12.5 |
| 6 | 3685 | 2.84 | 33690 | 480 | 6.6/−13.4 |
| 7 | 5090 | 2.9 | 16530 | 540 | 6.0/−15 |
| 8 | 4475 | 2.5 | 14230 | 410 | 3.0/−12 |
| 9 | 3680 | 2.6 | 17400 | 490 | 5.0/−15 |
| 10 | 4827 | 3.04 | 02180 | 880 | −6.4/−13 |
| 11 | 4397 | 2.1 | 10305 | 455 | ≦+10 |
| 12 | 5573 | 1.79 | 14513 | 479 | 8.5/−0.7 |

NOTES
[1]The firing temperature used to sinter the MLC's of the above examples was 1240° C.
[2]TCC is the % deviation in dielectric constant (K) at −55° C. and 125° C. relative to 25° C.

What is claimed is:
1. A process for preparing a ceramic dielectric composition having a chemically homogeneous coating of secondary metal oxide or hydrous metal oxide components on the surface of a primary ceramic particle component comprising the steps of:
   (a) adding a stable solution of metal chelates to a slurry of fine particle of primary ceramic component with an aqueous solvent with agitation;
   (b) adding a strong base to said slurry with metal chelates of step (a) while maintaining a sufficient temperature for a sufficient time to decompose said metal chelates and to deposit a homogeneous coating of secondary metal oxide or hydrous metal oxides components on the surface of the primary ceramic particle component; and (c) recovering an washing the homogeneously coated particles.

2. The process of claim 1 wherein the primary ceramic component is of a formula $ABO_3$ wherein A is predominately an alkaline earth metal, lead or mixtures thereof, and B is predominately titanium, zirconium or mixtures thereof.

3. The process of claim 1 wherein the primary ceramic components comprise alumina, silica and silicates.

4. The process of claim 1 or claim 2 or claim 3 wherein the solution of metal chelates comprises metal compounds in a solvent with a chelating agent.

5. The process of claim 4 wherein the metal compounds are of the general formula, $MX_n$, wherein M is a metal cation selected from magnesium, lead, titanium, zirconium, tin, niobium, tantalum, tungsten, antimony, bismuth, manganese, iron, cobalt, chromium, zinc, copper, neodymium, samarium, nickel, praseodymium, aluminum and mixtures thereof;

X is an anion or a radical selected from $HCO_2^-$, $CH_3CO_2^-$, $^{13}O_2C-CO_2^-$, $-OH$, $-OR$, $-NO_3$ and $-Cl$ and mixtures thereof; and n is a whole number from 2 to 6 depending on the valence state of the metal cation, $M^{+n}$.

6. The process of claim 1 or claim 4 wherein the solvent is selected from the group consisting essentially of deionized water or mixtures of deionized water and water miscible organic solvents, with the optional presence of a small amount of a wetting agent or surfactant.

7. The process of claim 4 wherein the chelating agent is selected from a group capable of forming soluble chelates with the metal cation after adjustment of the pH in the range of from 5 to 10.

8. The process of claim 7 wherein the chelating agent is selected from the group consisting essentially of alpha-hydroxycarboxylic acid or alpha-aminocarboxylic acid.

9. The process of claim 8 wherein the alpha-hydroxycarboxylic acid is selected from the group consisting essentially of glycolic acid, lactic acid, malic acid and citric acid.

10. The process of claim 4 wherein the pH of the solution of metal chelates is adjusted to a value in the range of from 5 to 10 by adding a base selected from the group consisting essentially of ammonium hydroxide, tetramethylammonium hydroxide, sodium hydroxide and potassium hydroxide.

11. The process of claim 1 wherein said slurry of fine particles of an aqueous ceramic powder in a solvent contains a small amount of silica.

12. The process of claim 1 wherein said strong base is selected from the group consisting essentially of potassium hydroxide and sodium hydroxide and the pH of the resulting mixture is adjusted to a value above 8.5

13. The process of claim 1 wherein the resulting mixture is heated in the range of 50° C. and the reflux temperature for 1 to 8 hours.

14. A process for preparing dielectric powder compositions comprising particles of ceramic powder by distributing a mixture of secondary metal oxide or hydrous metal oxide components surface of the particles to form a chemically homogeneous coating layer.

15. The process of claim 1 wherein said recovering and washing of homogeneously coated particles further comprises:

(d) drying said homogeneously coated particles.

16. The process of claim 15 further comprising the step of calcining said homogeneously coated particles.

* * * * *

UNITED STATES PATENT AND TRADEMARK OFFICE
CERTIFICATE OF CORRECTION

PATENT NO. : 5,082,811

DATED : January 21, 1992

INVENTOR(S) : Salvatore Anthony Bruno

It is certified that error appears in the above-identified patent and that said Letters Patent is hereby corrected as shown below:

Column 5, line 31, delete the phrase "-o$_2$C-CO$_2$-" and insert "O$_2$C-CO$_2$-"; and delete the phrase "-no$_3$" and insert "-NO$_3$".

Column 7, line 40, delete the word "an"; and line 41, delete the word "particle" and insert --particles--; and line 42, delete the phrase "This particular particle is" and insert --These particles are--.

Column 16, Ex. No. 11, TCC, delete "$\leq$+10" and insert -- $\leq$ +10--; and line 62, delete the word "particle" and insert --particles--; and line 63, after the word "component" delete "with" and insert --in--.

Column 17, line 1, delete "oxides" and insert --oxide --; and line 24, delete "$^{13}$O$_2$C-CO$_2$-" and insert "-O$_2$C-CO$_2$-".

UNITED STATES PATENT AND TRADEMARK OFFICE
CERTIFICATE OF CORRECTION

PATENT NO. : 5,082,811
DATED : January 21, 1992
INVENTOR(S) : Salvatore Anthony Bruno It is certified that error appears in the above-identified patent and that said Letters Patent is hereby corrected as shown below:

Column 18, line 16, delete the words "an aqueous" and insert --a--; and after the word "in" delete "a" and insert --an aqueous--; and line 28, after the word "components" insert --on the--.

Signed and Sealed this

Twenty-second Day of June, 1993

Attest:

MICHAEL K. KIRK

Attesting Officer

Acting Commissioner of Patents and Trademarks